Jan. 26, 1937.  G. E. GIBBS  2,069,063
METHOD OF FINISHING COMPOSITE PAPER SHEET MATERIAL
Filed Jan. 4, 1935  2 Sheets-Sheet 1
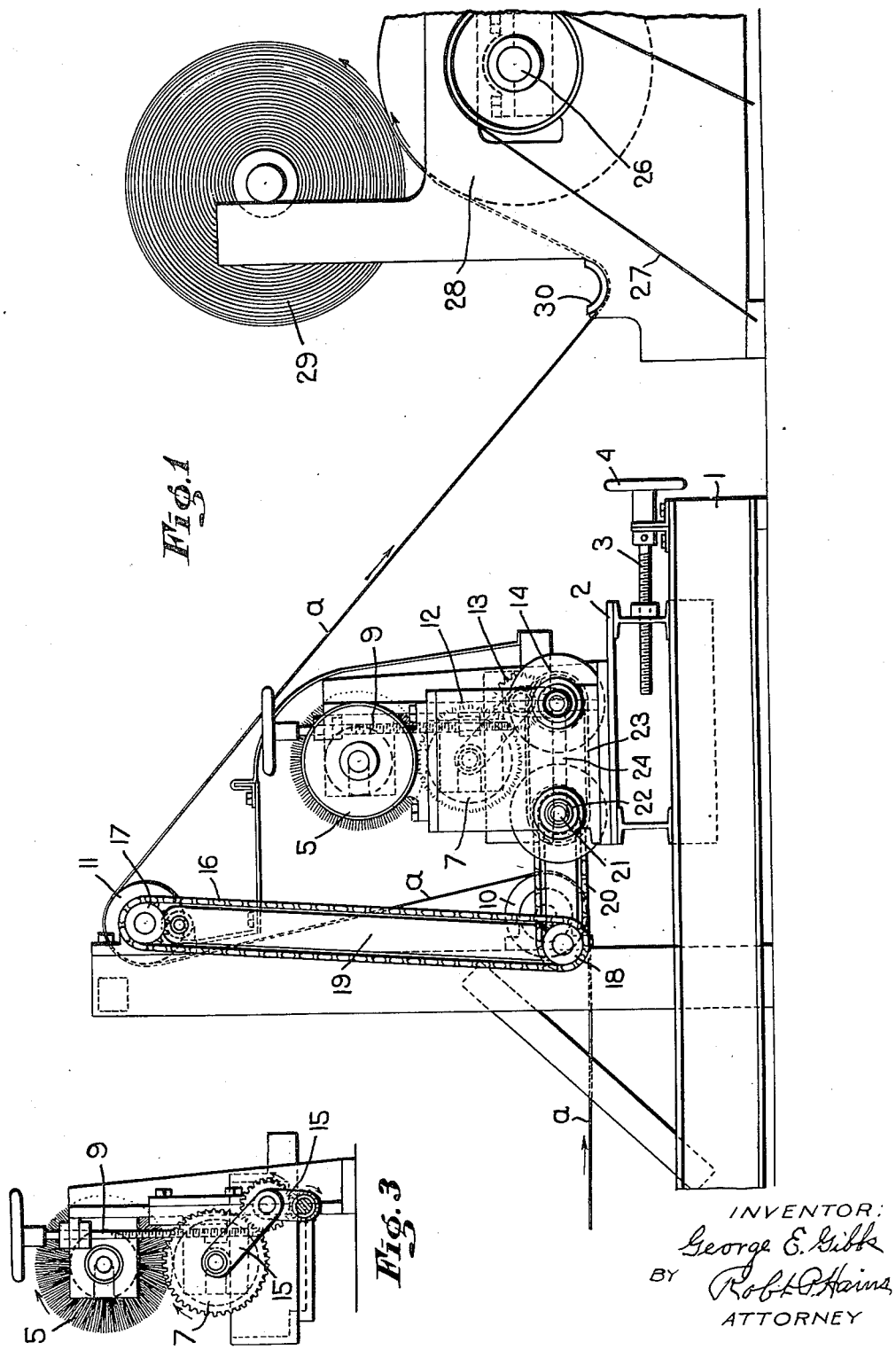
INVENTOR:
George E. Gibbs
BY Robt. C. Hains
ATTORNEY Jan. 26, 1937.  G. E. GIBBS  2,069,063
METHOD OF FINISHING COMPOSITE PAPER SHEET MATERIAL
Filed Jan. 4, 1935  2 Sheets-Sheet 2
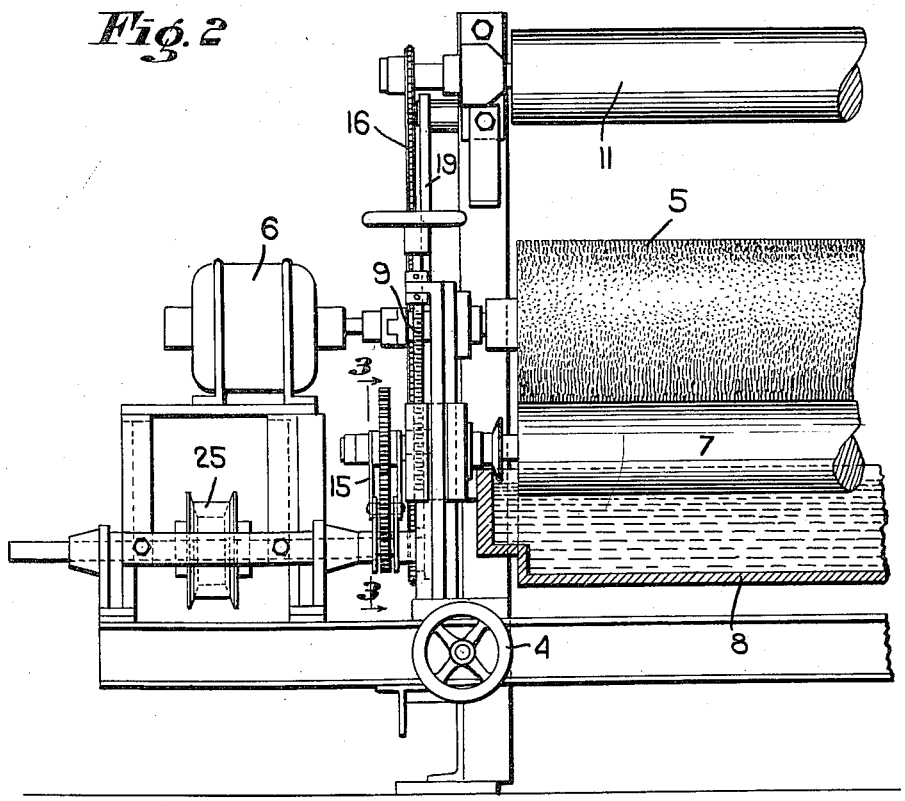
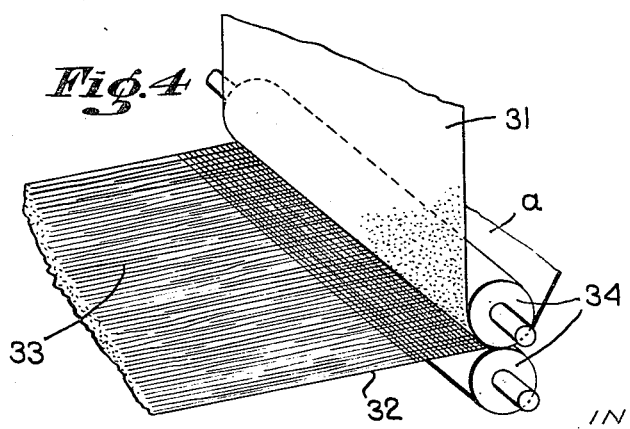
INVENTOR:
George E. Gibbs
BY Robt. P. Hains
ATTORNEY Patented Jan. 26, 1937

2,069,063

UNITED STATES PATENT OFFICE 2,069,063

METHOD OF FINISHING COMPOSITE PAPER SHEET MATERIAL

George E. Gibbs, Attleboro, Mass., assignor to American Reenforced Paper Company, Attleboro, Mass., a corporation of Massachusetts Application January 4, 1935, Serial No. 353

4 Claims. (Cl. 154—2)

This invention relates to a method for finishing composite paper sheet material and is more particularly directed to such a method when associated with paper sheets or layers which are united by a thermo-plastic adhesive.

In making the composite paper sheet material, it is now the usual practice to secure the layers of paper sheet material together face to face by a heated thermoplastic material, such for instance as asphalt or the like. The paper in sheet form as herein contemplated usually contains a normal amount of moisture which is expelled or evaporated when the paper layers are united together by the heated thermoplastic adhesive, with the result that the surface finish of the composite and completed sheet is liable to be rough or uneven in parts when exposed to the atmosphere. This is particularly observable where reenforcing filaments be longitudinally and/or transversely disposed or otherwise arranged.

One of the objects of the present invention is to overcome the conditions above enumerated and to provide a composite paper sheet material wherein the paper layers have been united by a heated thermoplastic material, so that the paper layers of the composite sheet may have returned to them the normal moisture that has been previously evaporated from them by the heat of the thermoplastic adhesive. More specifically stated the composite paper sheet material is formed of at least two layers of sheet paper which are secured together face to face by a heated thermoplastic material either with or without the interposition of reenforcing filaments between the sheets, and then one of the sheets is supplied with a moistening liquid and the composite sheet is then wound into a roll with the moistened paper layer of one wind in contact with the unmoistened paper layer of the next adjacent wind, with the result that moisture in the paper layer is partially transferred to the unmoistened paper layer so that both paper layers become supplied with the normal amount of moisture.

In winding the composite paper sheet material into a roll, as above indicated, longitudinal tension is placed upon the sheet material and the winds on the roll are subjected to pressure, which is due primarily to the weight of the roll and the tension on the composite sheet material.

In carrying the present method into practical effect the moistening liquid, whether it be water or other form of fluid, is preferably, though not necessarily, sprayed upon one of the paper layers. This is a facile way of transmitting the moisture to one of the paper layers and is susceptible of accurate adjustment so that the proper amount of moisture may be placed upon the paper layer.

One form of means for effecting the above purpose is shown in the accompanying drawings wherein:—

Fig. 1 is a side elevation of a machine for applying to one of the paper layers the desired amount of moistening liquid and winding the composite sheet material into a roll, as hereinbefore explained;

Fig. 2 is a front elevation, parts being broken away showing the portions of the liquid distributing means;

Fig. 3 is section on the line 3—3 of Fig. 2; and

Fig. 4 is a detached detail showing the composite paper sheet material being assembled face to face with the thermo-plastic material between in which are embedded reenforcing filaments.

The machine for carrying out the present method, as shown, comprises a base portion 1 on which is mounted a slide 2 capable of adjustment as by the adjusting screw 3, under the manipulation of a hand wheel 4.

Mounted in suitable bearings on the framework is the brush member 5 which may be driven from a suitable motor 6, Fig. 2, and the liquid to be placed upon one layer of sheet material is supplied to the brush 5 by a roll 7 which dips into a tank 8.

The amount of liquid that is supplied to the brush may be regulated conveniently by a screw 9 which is connected to the liquid tank 8 and serves to raise and lower the liquid tank 8 as well as the supply roll 7.

The composite sheet material $a$ which is to be treated is taken from a suitable source of supply and passes about a guide roll 10, Fig. 1, to present a run of the composite sheet material to the action of the spray delivered by the brush 5. Mounted on the upper portion of the machine is a roll 11 about which the composite material passes and from which the power for actuating the supply roll 7 is derived.

The supply roll 7 is connected to a train of gearing 12, 13 and 14, and insomuch as the slide 2 may be adjusted the described gearing is properly mounted on toggle members 15.

A sprocket chain 16 passes about a sprocket 17 on the roll 11 and extends downwardly and passes about a sprocket 18 mounted at the lower end portion of the toggle member 19.

The sprocket 18 is connected by a sprocket chain 20 to a suitable sprocket 21 on the shaft 22 which is mounted on the slide 2, and connecting the sprocket 18 with the shaft 21. Between the shaft 21 and the roll actuating member is a sprocket chain 23, the shafts 21 and the shaft for actuating the supply roll 7 are also connected by a link 24, the construction being such that as the composite sheet material a passes about the roll 11 the roll 11 will be turned or rotated and through the means described transmit motion to the train of gearing for rotating the supply roll 7.

It may be desirable at times to vary the speed of rotation of the supply roll 7 so there may be interposed between the train of gearing and its actuating means a speed change device of ordinary construction and typified in the present illustration at 25.

Mounted on the machine frame is a driving shaft 26 which may be actuated by suitable means, such for instance as the belt 27 and mounted on the shaft 26 is the winding drum 28 which serves to rotate the roll 29 for winding the composite sheet material and at the same time exert tension on the composite sheet material a and through such tension to rotate the roll 11.

From the construction described it will be apparent that the travel of the composite sheet material is utilized to actuate the distributing or supply roll 7 whose rotative movement and relation to the brush may be regulated as hereinbefore outlined.

From the construction described as one form of means for carrying out the method of the present invention it will be noted that the longitudinal movement and tension on the composite sheet material serves to actuate the supply roll 7 so that the run of the composite sheet material a may have distributed upon it the desired amount of liquid as it passes in front of the brush. The composite sheet material thus supplied with moisture on one of the sheets passes about a guide 30, Fig. 1, and then is wound upon the roll 29 with the moistened layer of each wind in contact with the unmoistened layer of the adjacent wind.

In Fig. 4 is represented a composite paper sheet material formed of the paper layers 31 and 32 having a thermo-plastic material interposed between the sheets along with reenforcing filaments 33 and the two sheets are forced together face to face by the rolls 34.

While the machine described constitutes a good and practical form of means for carrying the present method into effect it is to be understood that the invention is not limited to the arrangement of a machine as various types of machine to carry out the intent and purposes of the present invention may be employed.

What is claimed is:—

1. The method of finishing composite sheet material where layers have been secured together face to face by hot asphaltum which has the tendency to eliminate the moisture of the composite sheet material, applying to one of the paper layers only a liquid to return to that layer the moisture that was expelled therefrom by the heated thermoplastic, and winding the composite paper sheet into a roll with a moistened surface of the paper layer facing outwardly so that the unmoistened paper layer of the next wind shall contact with the moistened layer of the previous wind and transmit to the unmoistened layer the normal moisture that was expelled by the heated asphalt.

2. The method of making and finishing composite reenforced paper sheet material which consists in assembling two paper strips face to face and securing them in assembled relation by a heated thermoplastic adhesive, the heat of the thermoplastic adhesive being of a character to drive out the moisture from both paper sheets, interposing a reenforcing filament between the sheets, then applying a liquid to one only of the paper sheets and winding the composite paper sheet into a roll that the unmoistened paper layer of one wind shall come in contact with the moistened layer of the previous wind so that a normal amount of moisture will be transmitted to the unmoistened paper layer.

3. The method of returning normal moisture to the two paper layers of a composite paper sheet material from which the normal moisture has been expelled by the connecting hot asphalt, which consists in moistening one of the paper layers of the composite sheet while the other paper layer connected thereto remains dry, then winding the composite sheet into a roll that the moistened paper layer of one wind shall come in contact with the unmoistened paper layer of the next adjacent wind, so that part of the moisture of the moistened paper layer may be transferred to the dry or unmoistened paper layer.

4. The method of returning normal moisture to two paper layers of a composite paper sheet material from which the normal moisture has been expelled by the heat of the hot asphalt which serves to connect the two sheets, moistening one only of the paper layers of the composite sheet while the other paper layer remains dry, then winding the composite sheet into a roll with the moistened paper layer of one wind in contact with the unmoistened or dry paper layer of the next adjacent wind that part of the moisture of the moistened paper layer may be transferred to the unmoistened paper layer.

GEORGE E. GIBBS.